(12) United States Patent
Nilsen et al.

(10) Patent No.: US 7,128,276 B2
(45) Date of Patent: Oct. 31, 2006

(54) METHOD FOR MIXING FLUIDS (75) Inventors: Finn Patrick Nilsen, Bergen (NO);
Harald Linga, Nesttun (NO); Rune Fantoft, Rådalen (NO); Inge Sverre Lund Nilsen, Paradis (NO); Geir Inge Eide, Eikelandsosen (NO)

(73) Assignee: Statoil ASA, Stavanger (NO)

( * ) Notice: Subject to any disclaimer, the term of this patent is extended or adjusted under 35 U.S.C. 154(b) by 30 days.

(21) Appl. No.: 10/312,074

(22) PCT Filed: Jun. 29, 2001

(86) PCT No.: PCT/GB01/02913

§ 371 (c)(1),
(2), (4) Date: Mar. 17, 2003

(87) PCT Pub. No.: WO02/00334

PCT Pub. Date: Jan. 3, 2002

(65) Prior Publication Data

US 2003/0155436 A1   Aug. 21, 2003

(30) Foreign Application Priority Data

Jun. 29, 2000   (GB)   ................. 0015997.0

(51) Int. Cl.
*B05B 9/00*   (2006.01)

(52) U.S. Cl. ................ 236/124; 239/416.4; 239/416.5; 239/423

(58) Field of Classification Search .................. 62/121, 62/171, 304; 239/416.4, 416.5, 423, 424, 239/425, 434.5, 434, 124; 261/155, 28, 64.3, 261/97

See application file for complete search history.

(56) References Cited

U.S. PATENT DOCUMENTS 3,698,430 A   10/1972   Van Gasselt (Continued)

FOREIGN PATENT DOCUMENTS

DE   9202828   7/1992

(Continued)

OTHER PUBLICATIONS

Search Report—PCT/GB01/02913.

(Continued)

*Primary Examiner*—Mohammad M. Ali
(74) *Attorney, Agent, or Firm*—Patterson, Thuente, Skaar & Christensen, P.A.

(57) ABSTRACT

The use of a turbulent contactor to absorb a selected gas component from a gas stream. The invention particularly applies to a method of distributing a liquid into a gas stream which comprises providing a liquid to an annulus at the periphery of a pipe in which a gas stream is flowing, the gas flow drawing the liquid into a film along the inner surface of the pipe to a sharp edge at the end of the pipe at which point the liquid breaks off the surface of the pipe and mixes intimately with the gas.

27 Claims, 9 Drawing Sheets

U.S. PATENT DOCUMENTS

| | | | | |
|---|---|---|---|---|
| 4,019,983 A | * | 4/1977 | Mandt | 210/754 |
| 4,162,971 A | * | 7/1979 | Zlokarnik et al. | 210/620 |
| 4,405,563 A | * | 9/1983 | Samuels | 422/169 |
| 4,625,916 A | | 12/1986 | Nieuwkamp | |
| 4,668,498 A | * | 5/1987 | Davis | 423/579 |
| 4,932,213 A | * | 6/1990 | Summers et al. | 62/619 |
| 5,090,619 A | * | 2/1992 | Barthold et al. | 239/14.2 |
| 5,169,293 A | * | 12/1992 | Yamamoto | 417/179 |
| 5,238,665 A | * | 8/1993 | Lerner | 423/240 S |
| 5,273,734 A | * | 12/1993 | Sawyer et al. | 423/573.1 |
| 6,164,567 A | * | 12/2000 | Popov | 239/428.5 |
| 6,595,163 B1 | * | 7/2003 | Dumaz et al. | 122/404 |

FOREIGN PATENT DOCUMENTS

| | | | |
|---|---|---|---|
| EP | 0718032 | | 6/1996 |
| GB | 769821 | | 3/1957 |
| JP | 58-087102 A | * | 5/1983 |
| JP | 63088026 A | * | 3/1988 |
| JP | 63-88026 | | 4/1988 |
| JP | 11-276836 A | * | 10/1999 |
| SU | 1457971 | | 2/1989 |
| WO | 9913966 | | 3/1999 |

OTHER PUBLICATIONS

Preliminary Examination Report—PCT/GB01/02913.

* cited by examiner

METHOD FOR MIXING FLUIDS

TECHNICAL FIELD

The present invention relates to a method for efficiently mixing two or more fluids, in particular fluids of different phases. The invention also extends to apparatus for carrying out the method. The invention also relates to fluid separation systems, in particular the selective removal of a component or components from a mixture of gases using a liquid solvent or reagent. For example, the present invention may be concerned with the absorption of acid gases such as $CO_2$, $H_2S$, $NO_x$, oxides of sulphur etc. from natural gas and from combustion gases. Another application may be concerned with dehydration of gases by injecting chemicals.

BACKGROUND OF THE INVENTION

Conventional systems for the mixing of fluids in different phases employ columns which may be packed columns, plate columns or bubble-cap columns, or columns with some other form of contact medium. In these systems, the various fluids generally flow countercurrently.

The prior art systems suffer the disadvantage that in order to achieve a significant degree of gas/liquid contact, the columns have to be large and their operation is hampered by excessive foaming. Also the turn-down ratio of countercurrent contactors is limited due to flooding. In addition, any subsequent stripping section which might be required to remove the gas from solution must also be large, to handle the large volume of solvent or reagent used. Since the operation may well be carried out under high pressure and since the fluids involved may be highly corrosive, the capital costs of the large columns and subsequent stripping section are high. Furthermore, operating costs and maintenance costs are high.

Conventional systems for the absorption of acid gases employ a liquid solvent; typical solvents include amines such as methyldiethanolamine (MDEA), monoethanolamine (MEA) and diethanolamine (DEA). Mixtures of solvents can also be used. These solvents may be contacted with the sour gas mixture (gas mixture including acid gases) in a column such as that described above. The same problems with the size of the column and the volume of solvent required as described above still apply.

Alternatively, the liquid reacting irreversibly (also called scavenger liquid), may be simply injected into the gas or passed through some form of nozzle (e.g. 0.2 mm wide) to try to break up or atomise the liquid and increase the surface area of liquid in contact with the gas. This liquid performs an irreversible reaction with the gas and is not stripped for subsequent re-use. This system suffers the disadvantage that the size of the nozzle required to atomise the liquid to an acceptable level is very small and easily blocked. It is also very difficult to atomise viscous liquids such as the scavenger solvents referred to above at decent turn-down ratios of the liquid flow rate (low liquid flow rates). A nozzle also only gives a point distribution of liquid which gives only localised mixing.

It is therefore an object of the present invention to overcome the problems referred to above and to provide a means for improved dispersed distribution of liquid into the gas over a wide range of liquid flow rates.

It is a further object of the present invention to provide a method of selectively absorbing a fluid component from a fluid mixture with a high degree of efficiency and more economically (lower chemical consumption to overcome the specification prescribed) than in existing methods. In particular, it is an object of the present invention to provide a method of selectively removing a selected gas component from a gas stream with a high degree of efficiency.

SUMMARY OF THE INVENTION

According to a first aspect of the present invention, there is provided a method of distributing a liquid into a gas stream which comprises providing a liquid to an annulus at the periphery of a pipe in which a gas stream is flowing, the gas flow drawing the liquid into a film along the inner surface of the pipe to a sharp edge at the end of the pipe section at which point the liquid breaks off the surface of the pipe and mixes intimately with the gas.

The break up of the liquid film into filaments and droplets is dependent on the relative velocity between the gas and the liquid, and therefore it is possible to atomise viscous liquids at low liquid flow rates. An advantage of this is that it is relatively easy to control the quantity of liquid used while still using the absorption properties of the liquid efficiently.

The mixing of the gas and liquid is turbulent and is very intense and results in extremely efficient gas liquid contact. The efficient mixing means that absorption can take place very rapidly and in a relatively small amount of solvent compared to that required with a conventional nozzle. This in turn means that the liquid duty in the equipment is dramatically reduced. Using the method of the present invention, a reduction in the liquid duty of up to approximately 40% may be achieved compared to conventional nozzle/static mixer technology without a loss in gas-liquid transfer efficiency. This is particularly significant in situations where the reaction is irreversible and the used liquid has to be discarded, and it is therefore desirable to use as little liquid as possible and to use it to its maximum effect.

At the same time as reducing the liquid duty, the mixing system used is simple and inexpensive compared to prior art systems, leading to reduced construction and maintenance costs as well as the savings downstream referred to above. Finally, a degree of removal efficiency of approaching 100% of the selected gas component (e.g. acid gas from natural gas or combustion gas) can be achieved, for certain applications.

The method is preferably carried out as a continuous process and has the gas and liquid flowing co-currently. The co-current flow eliminates the problems associated with foaming or flooding, since separation can easily be effected downstream of the mixer.

Preferably, the pipe section upstream from the reaction zone in which the gas stream is flowing is a converging pipe section which, because of its shape, accelerates the gas as it passes the annulus of liquid. This accelerating gas stream preferably draws the liquid in a thin film along the side of the pipe to the sharp edge where the liquid breaks off into filaments. The production of these liquid filaments is determined by the relative velocity between the gas and liquid phases, the edge geometry and the surface tension between the gas and the liquid.

In the reaction zone just downstream of the sharp edge, the liquid filaments are further broken up into small droplets which provide extremely efficient areas for mass transfer. The break up of the liquid filaments into droplets is governed by the Weber number (We) where $$We = \frac{\rho_G U^2 d}{\sigma}$$

In which $\rho_G$ is the gas density, U is the relative velocity between the gas and the liquid phases, d is the characteristic filament dimension and $\sigma$ is the liquid-gas surface tension. Break up of the filaments occurs when $We > We_{cr}$—a critical value of the Weber number.

From wind tunnel experiments in which droplets are injected into the flow field, $We_{cr}$ is in the range of 8–10 (ref Krzeczkowski S "measurement of liquid droplet disintegration mechanisms" Int. J. multiphase Flow, Vol. 6, pp. 227–239,1980).

Once the liquid has broken up into droplets, the gas and liquid preferably mix intimately across the whole radial extent of the pipe and are not concentrated into a central region. The radial droplet mixing is determined by the Reynolds number (Re) where $$Re = \frac{\rho_m U_m D}{\mu_m}$$

In which D is the local pipe diameter, $U_m$ is the local mixture velocity, and ρm and μm are the density and viscosity of the fluid mixture respectively.

The radial distribution also depends on the ratio between the throat diameter at the edge and the ordinary pipe diameter as this governs the annular region at which the droplets are generated. The provision of the liquid in an annulus around the whole circumference of the pipe section ensures distribution of the liquid across the complete pipe section in contrast to the point distribution of a nozzle.

The method may optionally include the further step of separating a gas phase and a liquid phase after the turbulent mixing. The liquid phase may then optionally be treated to remove the absorbed gas component and may be recycled to the reactor.

It will be appreciated that the invention is particularly applicable to any absorption reaction where the reaction kinetics are rapid, for example, the absorption of acid gas component such as $H_2S$. The invention is also applicable to chemical reactions with fast reaction kinetics, where good mixing of the reactants is a requirement.

The method may also extend to the removal of a single selected component from a mixture of gases. Alternatively, the method extends to removing a plurality of gas components from a gas stream, either using a common solvent or reagent, or by respective solvents or reagents. According to a further aspect of the invention, the gas stream is a single gas component which is absorbed.

Preferably after the contracting pipe there is a diverging section to expand the gas, reducing the speed of the gas and increasing the gas pressure. In this way, the system can be operated with a relatively low permanent pressure drop across the whole system.

The apparatus is independent of pipe inclination but it should preferably not be installed just upstream from a pipe bend as this may disrupt the substantially homogeneous flow generated. Preferably the apparatus is arranged substantially horizontally.

The invention also extends to the apparatus for carrying out the method. Preferably the apparatus comprises a turbulent contactor having a contracting pipe through which a gas stream flows, a liquid inlet configured to produce an annulus of liquid around the internal perimeter of the contracting pipe, a sharp edge at the end of the contracting pipe and a further pipe section downstream of the sharp edge. Preferably there is a diverging section downstream of the sharp edge to recover some of the pressure dropped over the contracting section.

The sharp edge is preferably substantially a right angle, although both acute or obtuse angles may be preferable for use with specific liquids. The aim of the sharp edge is to provide a means for efficiently distributing the liquid in the gas stream. If the sharp edge is at an acute angle (i.e. it doubles back towards the contracting pipe section) there may be a sharper edge which is preferably used for more viscous liquids who have a higher affinity for the surface of the pipe. Alternatively, for a less viscous liquid an obtuse angle may be sufficient to distribute the liquid in the pipe.

Preferably, the gas stream and the liquid are formed into a homogeneous mixture in the contactor, the homogeneous mixture eventually being separated into a gas phase and a liquid phase in a downstream vessel. Optionally, this phase separation occurs in a hydrocyclone.

Preferably, the solvent or reagent in the liquid phase is subjected to a regeneration treatment to remove the absorbed selected gas component. Preferably the regenerated solvent-containing liquid phase is recycled to the contactor.

Preferably, the regeneration is carried out by heating and/or by flashing off the absorbed gas component in a flash tank. Preferably, the post mixing cooling and the regenerative heating are achieved, at least in part by mutual heat exchange.

The invention may be considered to extend to the use of a turbulent contactor for absorbing a selected gas component from a gas stream by bringing the gas stream into contact with a liquid including a solvent or a reagent for the selected gas component, thereby causing the gas component to be absorbed by the solvent or reagent. In particular, the invention extends to the use of a contactor of the present invention to absorb acid gases such as $H_2S$ and $CO_2$ from natural gas. A number of specific uses for the apparatus and method of the present invention will be discussed in detail later.

The flexibility of the apparatus and method of the present invention enable it to be used in a wide range of areas. In particular the ability of the system to operate at extremely high gas/liquid ratios with very low flowrates of viscous liquids allows efficient use of liquid solvents and reagents, maximising the loading of the solvents without affecting the overall performance of the system.

Suitable solvents for use in the method of the present invention include amines such as MDEA, MEA and DEA and mixtures of solvents. Irreversibly reacting solvents are preferred for $H_2S$ scavenger applications. Seawater is also suitable as a solvent as the high utilisation of loading capacity of the solvent and the low cost of the solvent may, in many cases, compensate for the lower loading capacity.

The separation/absorption/reaction systems described are generally single operations, however it will be appreciated that multi separation/absorption/reactions may be performed. These may be carried out simultaneously or sequentially and may also be carried out in series or in parallel. In particular, there may be more than one such turbulent contactor in a single gas pipe.

The invention also therefore extends to a method for remixing a multiphase flow. Preferably a multiphase flow is passed along a converging pipe to a sharp edge where the flow is broken and turbulent mixing occurs across the radial extent of the pipe. Optionally there is a further supply of liquid prior to the sharp edge. Preferably this liquid is supplied in the form of an annulus of liquid around the internal periphery of the pipe. The liquid is then conveyed in the form of a film along the inner surface of the pipe by the accelerating multiphase flow to the sharp edge of the pipe where the liquid breaks up into filaments. These filaments are then preferably broken up into droplets and mix intimately with the multiphase flow across the whole width of the pipe. There may optionally be a diverging section after this reaction zone in which the pressure of the multiphase flow increases thereby minimising the permanent pressure drop across the contactor.

It will be appreciated that the methods and the systems described above may be used to selectively remove one or more gas components from a gas stream. Selective absorption may be generated by adjustment of the residence time through the system. Since the rates of reaction for the absorption of different gases by a particular solvent will vary, it is possible to selectively absorb one gas in preference to another over a controlled time period. An example of this is the selective absorption of $H_2S$ in an amine, which is virtually instantaneous, in preference to $CO_2$ which is absorbed more slowly.

The selective absorption of the $H_2S$ over the co-absorption of $CO_2$ by the amine results in an improved efficiency of use of the amine. By reducing the co-absorption of $CO_2$, the required level of $H_2S$ removal may be achieved with less amine liquid. The reduction in liquid duty will be carried through the regeneration system and will reduce the size of the apparatus required. Both installation and operational costs are significantly reduced. These reductions may be achieved using standard amine solutions and do not require the production of specifically tailored chemical systems.

The improved efficiency possible for the removal of, for example, acid gases makes the present invention particularly valuable as awareness is increased of the potential damage to the environment that can be caused by acid gases in effluents such as combustion gas.

Furthermore, the small size of the apparatus when compared to the size of conventional absorption columns render the invention especially applicable to use in marine applications, such as on board shuttle tankers where space is at a premium.

The invention may be put into practice in various ways and a number of specific embodiments will be described by way of example to illustrate the invention with reference to the accompanying drawings.

The invention may be put into practice in various ways and a number of specific embodiments will be described by way of example to illustrate the invention with reference to the accompanying drawings.

BRIEF DESCRIPTION OF THE DRAWINGS

FIG. 10b shows a concentration profile of the absorption of $H_2S$ across the three contactors of FIG. 10a.

DETAILED DESCRIPTION OF THE DRAWINGS

Figure 1:
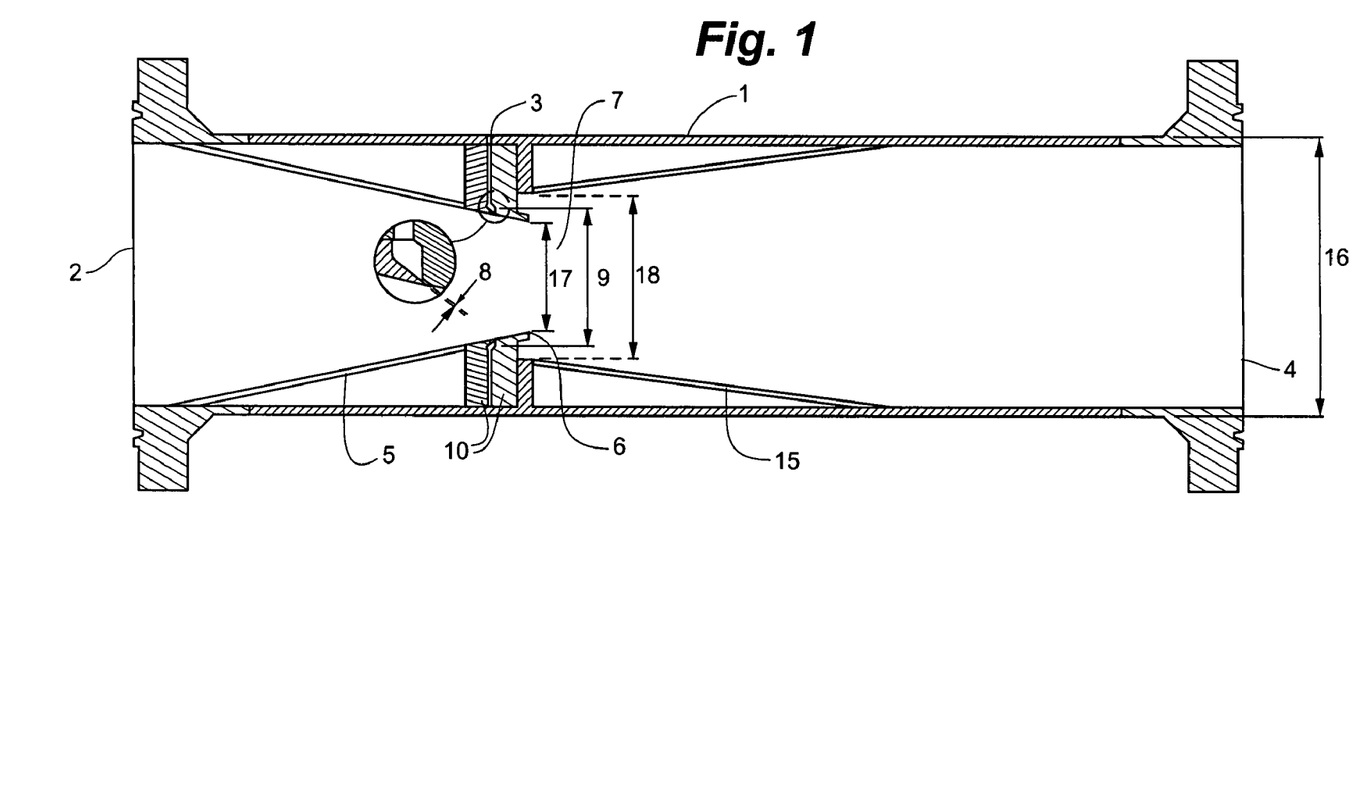
FIG. 1 is a view of a turbulent contactor suitable for use in the method of the present invention.

FIG. 1 shows a turbulent contactor which may be used in the method of the present invention. The contactor 1 comprises a gas stream inlet 2, a liquid stream inlet 3 and an outlet 4. The gas stream is supplied to the gas stream inlet which leads to a converging pipe section 5. The converging pipe section 5 accelerates the gas stream as it passes the liquid stream inlet 3 to the end of the pipe section 5 where there is a sharp edge 6. Downstream of this sharp edge 6 there is a reaction zone 7 where the gas and liquid are preferably formed into a homogeneous mixture.

The liquid is supplied to the liquid stream inlet 3 from where it is fed in a controlled manner to the inside of the converging pipe section 5. The liquid is presented to the pipe in the form of an annulus around the inner surface of the pipe. The initial phase velocity of the liquid exposed to the gas stream is governed by the liquid flowrate, the gap distance 8 and the annulus distance 9. The gap distance 8 may be varied by movement of the blocks 10. The gap will be varied to take into account the liquid solvent being used, the properties of which vary considerably. The liquid annulus diameter 9 may be varied by changing the angle of the converging pipe or by moving the position of the liquid annulus relative to the end of the converging pipe.

Figure 2:
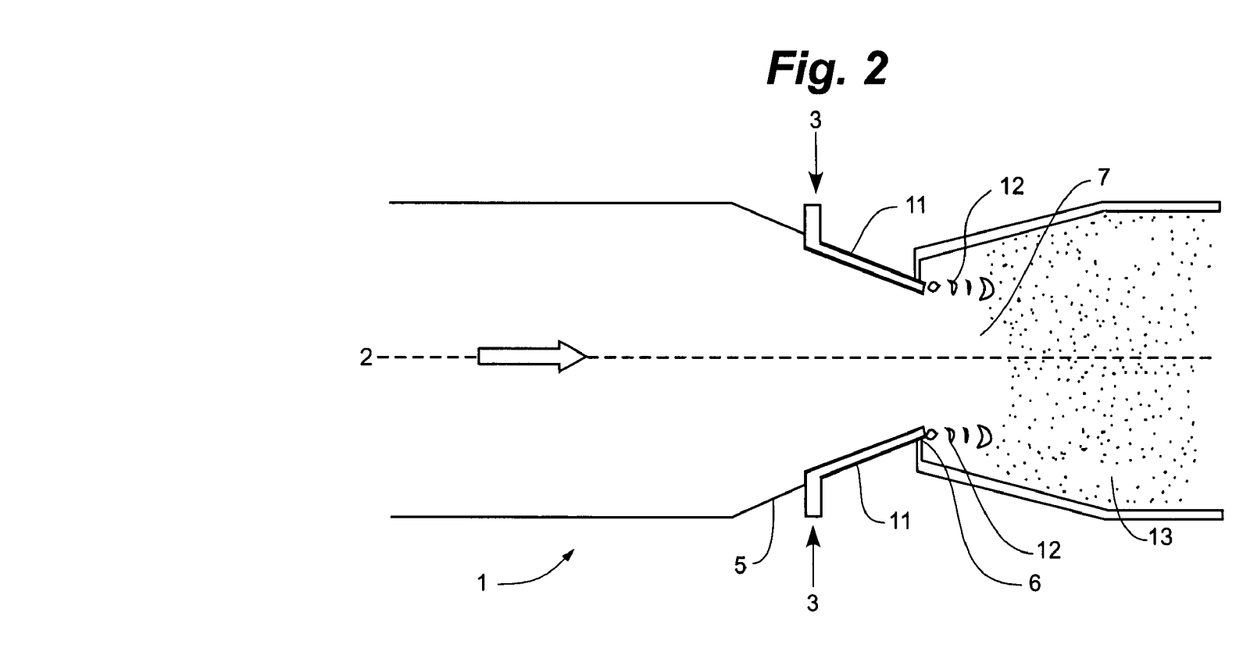
FIG. 2 is a schematic representation of the break up of the liquid film into droplets.

The liquid annulus presented to the inner surface of the pipe is drawn along the inner surface of the pipe in the form of a film 11 by the gas stream. This is best seen in FIG. 2. The liquid film 11 closely adheres to the side of the pipe section 5 until the sharp edge 6 is reached. At this point, the liquid film breaks up to form filaments 12. The generation of the filaments, and their subsequent velocity vector, is determined by the relative velocity between the gas and the liquid phases, the gas-liquid surface tension and the sharp edge 6. Due to the extremely turbulent conditions in the reaction zone 7, the filaments 12 are further broken up into very small droplets 13 which provide a very high surface area to volume ration thereby making extremely efficient use of the liquid provided. This allows the use of considerably smaller volumes of liquid than are required by the conventional prior art processes. The formation of droplets in the reaction zone is favoured by a high We number and consequently by a high gas flowrate.

The small liquid droplets and the gas stream are intimately mixed in the reaction zone 7 and the multiphase stream passes on through a conical diffuser 15 (see FIG. 1) where some of the pressure dropped in accelerating the gas stream in the converging pipe section 5 is recovered. The multiphase stream may then pass on to a separation vessel such as a hydrocyclone unit where the "cleaned" gas stream is separated from the liquid now including the absorbed gas(es). The liquid may or may not be regenerated and if it is it may be recycled to the liquid inlets 3.

Figure 3:
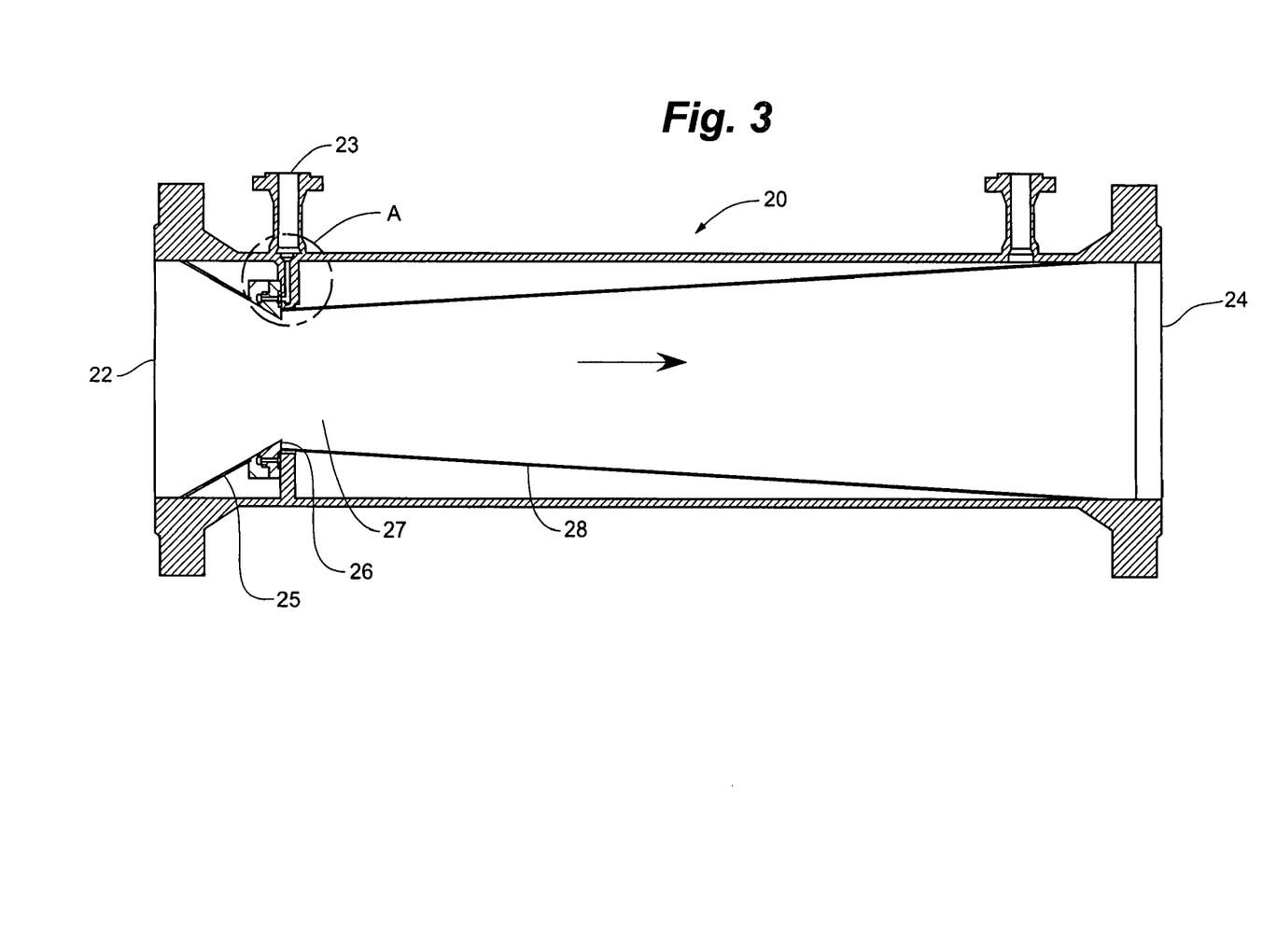
FIG. 3 is a view of a second turbulent contactor suitable for use in the method of the present invention.

FIG. 3 shows a second embodiment of a contactor suitable for use in the method of the present invention. Contactor 20 comprises a gas stream inlet 22, a liquid stream inlet 23 and an outlet 24. The gas stream is supplied to the gas stream inlet which leads to a converging pipe section 25 for accelerating the gas stream. At the end of the converging pipe section there is a sharp edge 26 downstream of which there is a reaction zone 27 where the gas and liquid are preferably formed into a homogeneous mixture. One difference between the contactor of FIG. 1 and that of FIG. 3 is the relative location of the liquid inlet to the annulus of liquid. In this case, the liquid is supplied to the inlet 23 from where it passes through the passages 23a and 23b to a reservoir 23c which passes round the circumference of the pipe. The liquid then passes out through the channel 23d which again passes round the whole circumference of the pipe (see FIG. 4) to an annulus on the inner surface of the converging pipe section. Because of the shear stress conditions and dynamic pressure exerted by the gas to the liquid, the liquid stream still adheres to the surface of the pipe until the sharp edge 26 is reached.

Another difference between the two contactors is in the slope of the converging pipe sections 5, 25. In contactor 20 the converging pipe section 25 has a considerably steeper slope than that of contactor 1 and therefore reaches a smaller cross sectional area in the same length of pipe. The diameter ratio between the throat and the pipe as well as the angle of the converging cone can be varied independently. This reduced cross sectional area will result in a greater acceleration of the gas stream as it approaches the sharp edge but will also result in a consequently larger pressure drop. Also the selection of the angle of the converging pipe will be affected by the permanent pressure drop which can be accommodated over this apparatus. As indicated previously, the break up of the liquid into filaments and subsequently into droplets is controlled by the Weber number. This is dominated by the square of the relative velocity between the gas and the liquid phases. Therefore a small change in the velocity of the gas stream, controlled in part by the acceleration generated by the angle of the converging pipe section, may have a significant effect on the break up of the liquid and hence the efficiency of the system.

Figure 4:
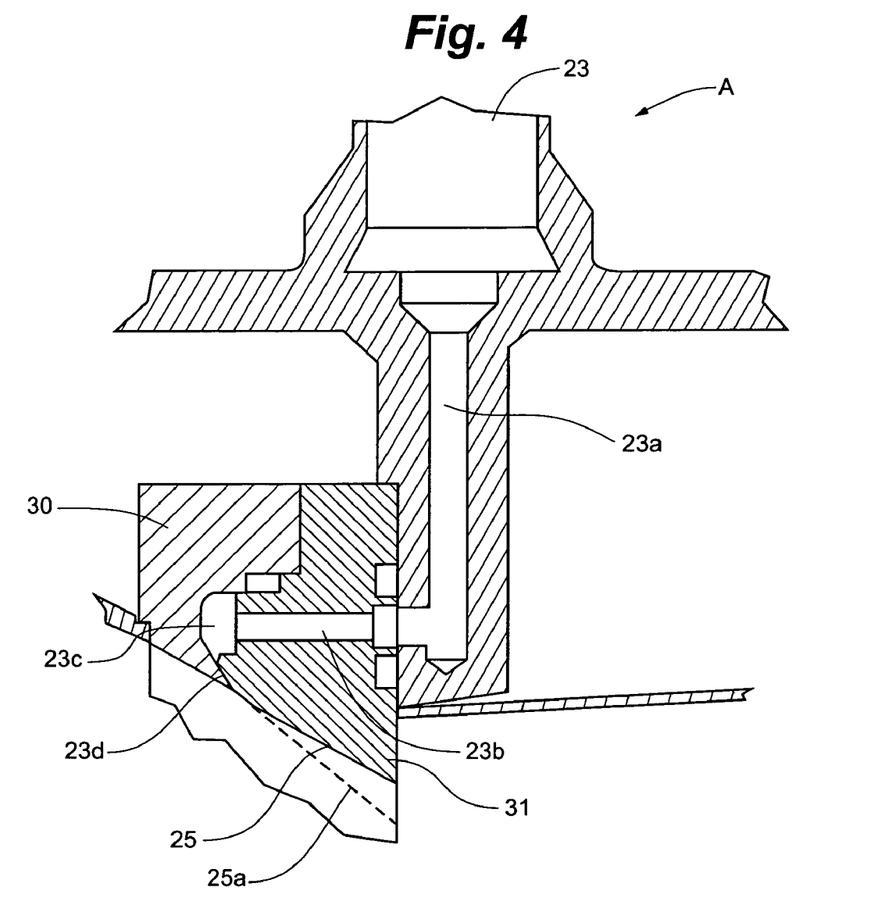
FIG. 4 is an enlarged view of the liquid stream inlet portion of the contactor shown in FIG. 3 ringed in circle A.

FIG. 4 shows an enlarged cross section of the area within the circle A of FIG. 3. This shows in greater detail the passage of the liquid through the liquid stream inlet 23. The liquid passes through passages 23a and 23b to a chamber 23c which passes round the circumference of the pipe. The liquid is then fed via the narrow passage 23d to the inner surface of the conical pipe section 25. The passage 23d is shown to be very narrow and may be of the order of just 0.2 mm wide. The pressure drop across this passage is carefully controlled and adjusted to ensure a homogeneous distribution continuous flow of liquid around the whole pipe circumference at the converging pipe section 25. As indicated above, the size of the passage 23d is controlled by movement of the blocks 30 and 31. The dotted line 25a indicates an alternative slope for the converging pipe section 25, which gives a higher gas phase velocity and hence enhanced mixing, but will increase the permanent pressure drop across the apparatus. This change may be effected simply by the replacement of one part of the apparatus by another.

After the gas and liquid have been intimately mixed in the reaction zone 27 just downstream of the sharp edge 26, there may be a diverging section 28 to recover some of the pressure drop. The length of section 28 may be varied to control the degree of pressure recovery. Following the diverging section 28 there is preferably a considerable length of straight pipe to maintain the flow pattern generated and to allow further reaction to take place (see FIG. 3). The length of the straight pipe is recommended to be of the order of 15 to 20 standard pipe diameters.

Typical dimensions of the contactors may be in the range of 51–1016 mm (2–40 inches) in diameter. In particular, the apparatus for scavenging of natural gas may have a pipe diameter 16 (see FIG. 1) of 610 mm (24 inches) with a sharp edge diameter 17 of 253 mm (10 inches). The initial diameter 18 of the diverging pipe may be 370 mm (14.5 inches). As stated above, the sharp edge diameter may be varied along with the slope of the converging pipe and other sharp edge diameters which may be used include 296 mm (11.7 inches) similar to that shown in FIG. 3 and 272 mm (10.7 inches).

The present invention may be used for the removal of $H_2S$ from natural gas. Natural gas may be supplied to the contactor at any pressure. Typically this may be between 20 and 150 bar. The liquid used will typically be regenerable amines, for example MEA, DIPA or MDEA. Also non-regenerable solvents such as triazin-based chemicals can be used. In general these solvents are very reactive with $H_2S$ meaning that the reaction is fast and a very small amount of liquid is needed for a large throughput of gas. Typically the liquid flow rate may be in the range of 200 to 1000 l/hour and the gas flowrate may be of the order of 15 million standard cubic meters per day with an initial $H_2S$-concentration of typically 10–100 ppmv. It will be appreciated that the gas/liquid ratio may therefore be very high, for example up to 20 000 when using non-regenerable scavenging liquids. This is a much higher ratio than conventional systems are able to deal with. The temperature of the reaction may be anywhere between 0° C. and 150° C. The temperature of operation may be selected to maximise the efficiency of the solvent used. As stated above, the method of the present invention allows a reduction in liquid duty of non-regenerable solvent of, for example, 40% when compared to the systems of the prior art. For regenerable solvents, selectivity of the desired gas component over unwanted co-absorption of other components can result in similar or even greater reductions in the quantity of liquid which is circulated round the system.

Figure 5:
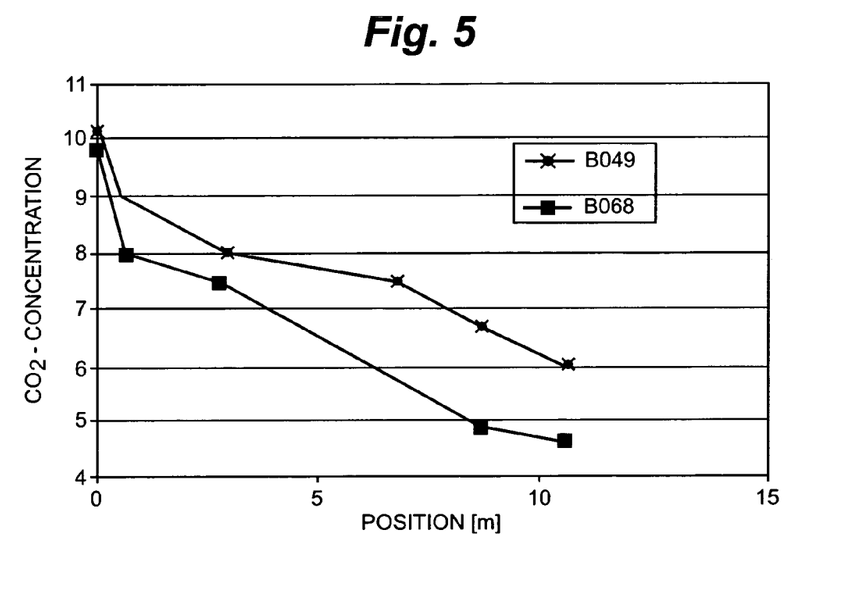
FIG. 5 is a graph comparing the performance of a contactor according to the present invention with a prior art contactor.

FIG. 5 shows the results of a comparison test conducted on a mixture of 10% $CO_2$ with air using a liquid solvent of 20% MEA with water. The operating pressure is 13 bar and the temperature is 15° C. The gas-liquid flowrate ratio is 70 and the superficial mixture velocity is 12 m/s. The results for the contactor of the present invention are indicated by the code B068 and they show that there is a considerable reduction in the concentration of the $CO_2$ in the gas stream after just 10 meters of pipe. The apparatus for this test has a contactor similar to that shown in FIG. 1 at position 0 meters and has a further mixer without an outlet diffuser at position 6.6 meters downstream of the inlet. It is clear that the method of the present invention provides an improved performance over a prior art mixer similar to that shown in FIG. 6, the results of which are indicated by code B049.

Figure 6:
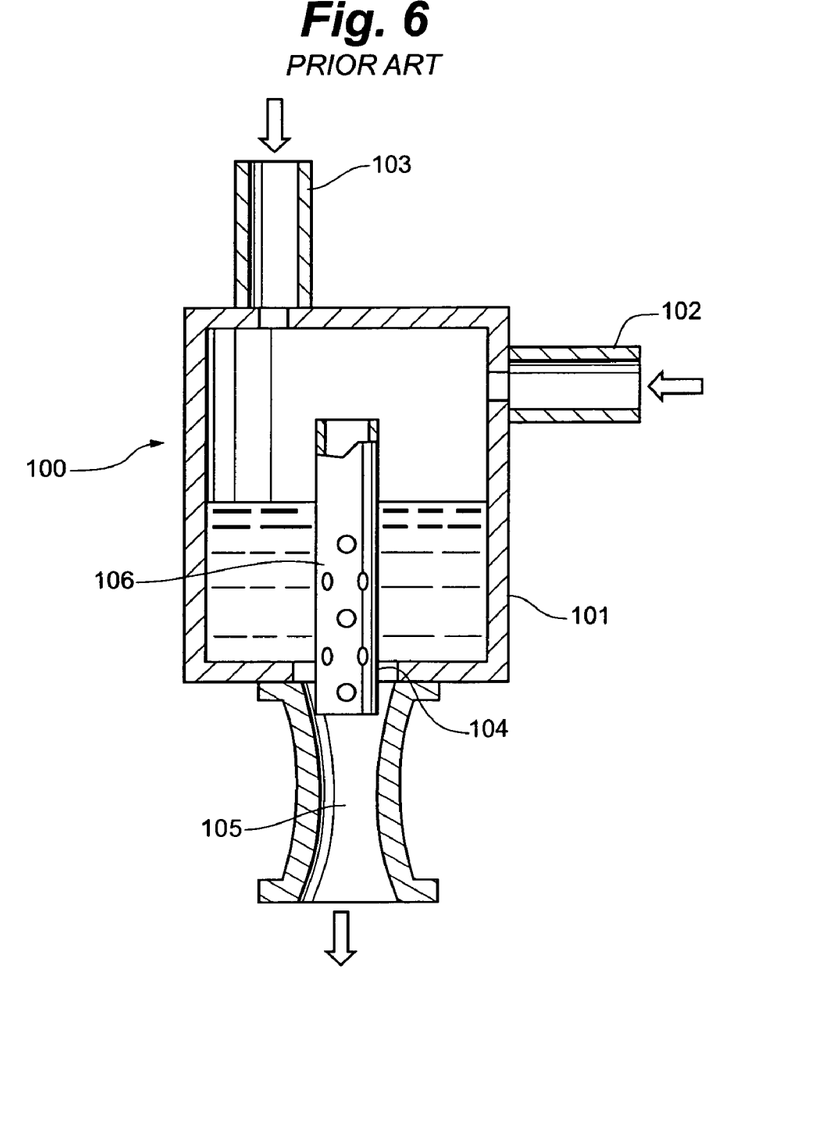
FIG. 6 shows a prior art contactor similar to that used in the comparison tests the results of which are shown in figure 5.

The contactor 100 of FIG. 6 comprises a vessel 101 having a first fluid inlet 102, a second fluid inlet 103 and an outlet 104 leading to a venturi passage 105. There is a tube 106 (which may or may not be perforated) extending from the outlet 104 back into the vessel 101.

It will be apparent to a person skilled in the art that the results from the experiments described above are not dependent upon the gas to be absorbed or on the solvent used to absorb that gas. Therefore it is clear that the above method of distributing a liquid in a gas stream and the subsequent selective transfer of a gas from a mixture of gases to a liquid solvent for that gas is applicable to any gas and any respective solvent.

A number of specific applications for the method and apparatus of the present invention will now be described in greater detail by way of example.

The contactors of the present invention may be used for the scavenging of $H_2S$ from gases where the initial concentration of $H_2S$ may typically be in the range 10–100 ppmv. As indicated in the preamble above, the removal of $H_2S$ from natural gas to meet pipeline specification (less than 20 ppm for safety reasons and in the range of 2–4 ppm for sales quality) is generally carried out with either a conventional counter current column based on regenerative amine systems or by $H_2S$ scavenging. In this latter process, the chemical injected into the gas pipe flow reacts irreversibly with the $H_2S$ component of the gas stream. Since the scavenging material is not regenerated, there are large running costs associated with the consumption of the scavenging material. Using the injection processes of the prior art, the relatively low flow rate of the liquid compared to the gas stream results in poor fluid mixing. Better mixing and hence better efficiency would allow a reduction in the quantity of the expensive scavenging material needed.

The present invention provides for an extremely efficient mass transfer between the $H_2S$ and the solvent by means of the efficient droplet generation across the width of the pipe. This therefore enhances the efficiency of the liquid solvent and reduces the consumption of the $H_2S$ scavenging chemical without affecting the level of reduction in the $H_2S$ concentration.

It has been found that the use of the apparatus and method of the present invention has resulted in a 30–40% reduction in the consumption of the scavenger chemical when compared to conventional scavenger systems. The small size of the apparatus enables it to be used in addition to existing systems thereby reducing the liquid duty on the existing columns.

This selective removal of $H_2S$ can also be useful in other areas if there is no requirement to reduce the level of $CO_2$ in the gas stream. In the processes of the prior art a significant amount of the sour gas capacity of the amine may be taken up by the unnecessary absorption of $CO_2$. If this capacity could be freed up for the absorption of $H_2S$, the number and size of reactors and pipelines may be reduced, reducing the space required and the capital and running costs.

Experimental results on a gas stream which has inlet conditions of 20 ppmv $H_2S$ and 10% $CO_2$ at a pressure of 13 barg and a gas flowrate of 250 m$^3$/h show that 82% removal of the $H_2S$ can be achieved at gas-liquid flowrate ratios of greater than 300 and that 90% removal (i.e. down to 2 ppmv $H_2S$) can be achieved at ratios of approximately 230. These ratios are considerably higher than can be used in conventional apparatus for the same task.

Figure 7:
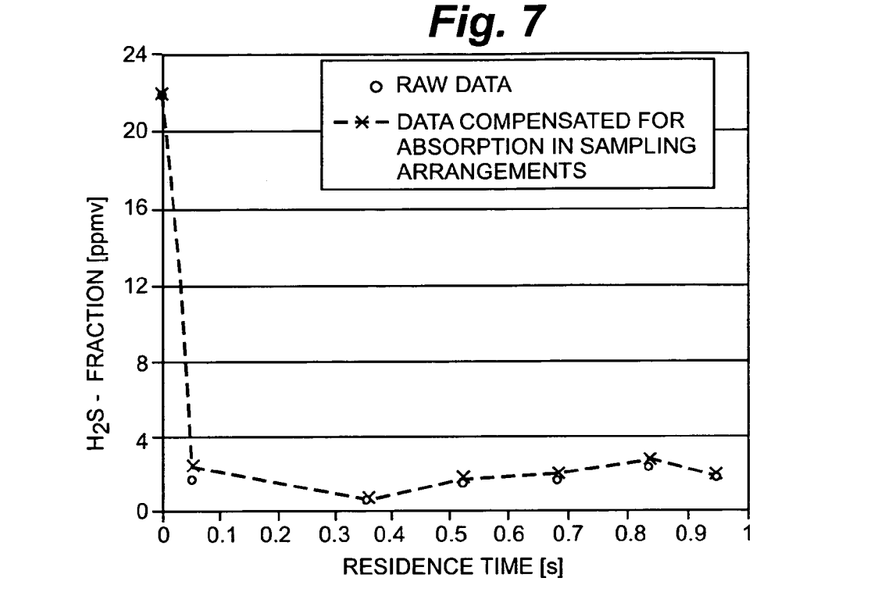
FIG. 7 shows the $H_2S$ concentration against residence time for a contactor of the present invention.

FIG. 7 shows the almost instantaneous effect of the contactor on the absorption of $H_2S$. In less than 0.1 s the level of $H_2S$ is down from 20 to 2 ppmv. As the residence time increases downstream the $H_2S$ concentration increases again as the $CO_2$ is absorbed. The compensation referred to in FIG. 9 accounts for gas absorption taking place in the gas sampling arrangements.

For regenerative systems, the liquid duty in the system is significantly reduced because of the selectivity of the standard amine solution for $H_2S$ over $CO_2$ achieved using the apparatus of the present invention. The short contact time, achieved through co-current flow, allows the $H_2S$ to be absorbed in preference to the $CO_2$. Less regenerable liquid is therefore required and duty on the plant is accordingly lower.

In experimental studies the applicability of the contactors of the present invention to the selective removal of $H_2S$ over $CO_2$ has been tested. For natural gas with initially high $CO_2$ and low $H_2S$ contents, the removal of $H_2S$ requires an extremely selective process in order to remove the $H_2S$ to specification level. The term selectivity for $H_2S$ removal at the expense of $CO_2$ can be defined as the relative change in the $H_2S$ concentration per unit time divided by the relative change in the $CO_2$ concentration per unit time. The selectivity will vary from solvent to solvent.

Figure 8:
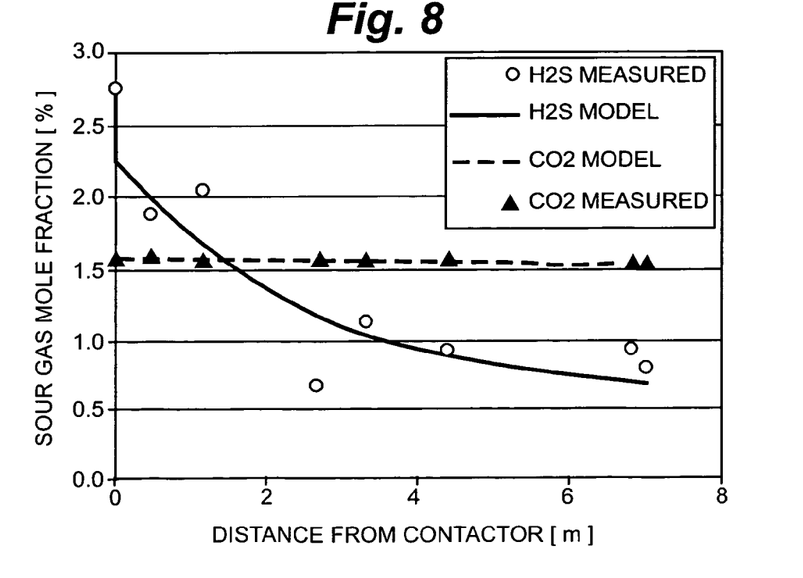
FIG. 8 shows a graph of gas concentration against distance from the contactor for $H_2S$ and $CO_2$.

The selectivity together with other variables, such as the loading capacity and the initial loading of the solvent, determines the solvent circulation rate needed. The selectivity may be manipulated by varying the exposed contact area between the gas phase and the solvent and the exposure time for actual phase distribution. The extremely efficient mixing of the contactor of the present invention results in shorter residence times than in conventional columns. Due to the slower $CO_2$ absorption there is not sufficient time to reduce the $CO_2$-concentration to a significant level. FIG. 8 shows a gas concentration profile for $H_2S$ and $CO_2$ in the pipe downstream of a contactor of the present invention. The inlet gas stream had 2.75% $H_2S$ and 1.5% $CO_2$ and this is indicated at position 0 m on the graph. The models employed to generate the curves shown on the graph are basically first order kinetic theory for sour gas absorption in a contactor such as that shown in FIG. 1 or FIG. 3. It can be seen that a significant absorption of $H_2S$ gas occurs in the contactor whereas virtually no such absorption of the $CO_2$ occurs.

Figure 9:
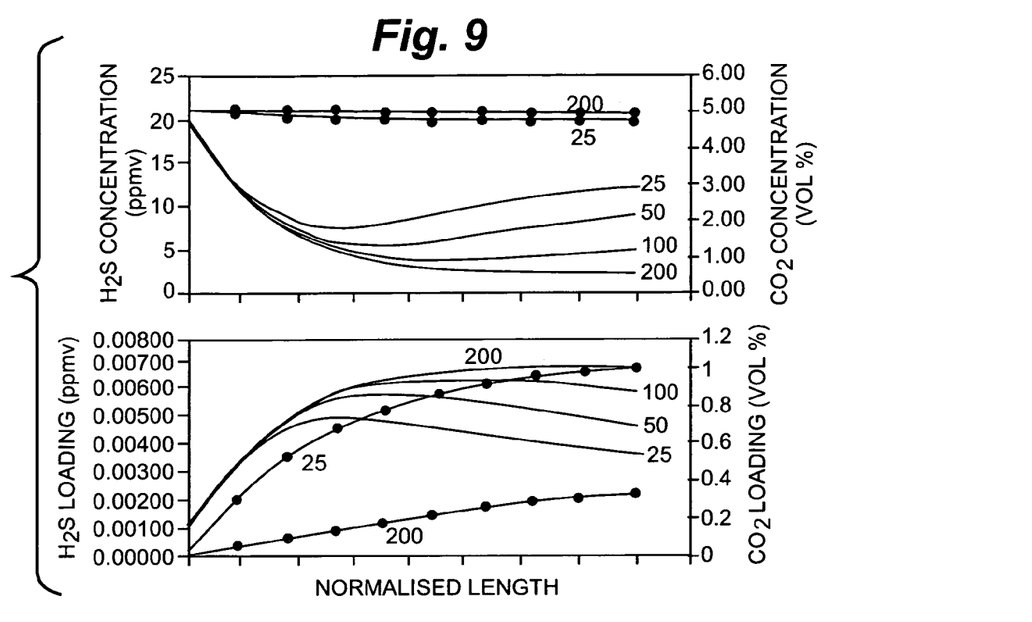
FIG. 9 shows two graphs indicating the effect of the selectivity factor on absorption of $CO_2$ and $H_2S$.

FIG. 9 shows two graphs indicating predicted gas concentrations and solvent loading profiles along a contactor pipeline for different selectivity factors. For the sake of these graphs, the effect of the contactor has not been included and the graphs show the variations in concentration along a pipeline. The solvent is pre-loaded with 0.001 moles $H_2S$/mole of solvent. The top figure illustrates the effect of $CO_2$ being absorbed with increasing length away from the inlet position. For both a selectivity of 25 and 200, the value of the $CO_2$ does not appear to change significantly from the 5% by volume at which it starts. However, looking at the curves for the $H_2S$, it can clearly be seen that for the lower selectivity of 25 the concentration of $H_2S$ in the stream increases significantly as the $CO_2$ is absorbed displacing the $H_2S$ from the solvent. At a selectivity of 200 this effect is far less pronounced and negligible within the length scale shown. The second graph shows the solvent loading by both $H_2S$ and $CO_2$ for a variety of selectivities. Again for the lower selectivity of 25, the $H_2S$ concentration in the solvent drops off as the $CO_2$ is absorbed displacing the $H_2S$.

The present invention may also be used to selectively absorb $H_2S$ over $CO_2$ using a regenerable solvent in situations where the initial $H_2S$ concentration is higher, such as 2–5% by volume, for example in the refining industry. This is particularly advantageous in situations where the $H_2S$ is to be treated in a Claus plant to convert the $H_2S$ into liquid sulphur. $CO_2$ acts as an inert gas in a Claus plant, reducing the sulphur recovery capacity. The use of the method and apparatus of the present invention with a suitable amine favours absorption of $H_2S$ over $CO_2$ by means of kinetic selectivity. The $H_2S$ is absorbed almost instantaneously whereas the $CO_2$ is absorbed over a much longer time period.

Figure 10A:
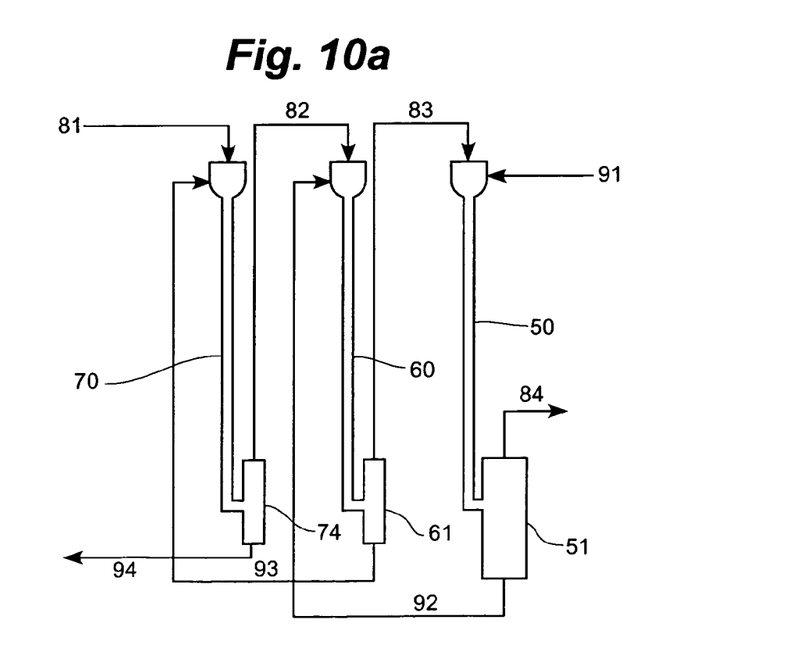
FIG. 10a shows a schematic arrangement of three contactors of the present invention in series.

A particularly preferred arrangement for achieving the required $H_2S$ absorption is shown in FIG. 10a in which a number of the co-current contactors of the present invention are configured in series with the solvent fed to the final step (where the output is clean gas) being re-circulated to the previous step (where there is a higher concentration of $H_2S$) and so on. The system thereby operates as a counter-current process overall although the individual contactor stages are still co-current and accordingly benefit from the kinetic $H_2S$ selectivity referred to above. As the off gas flow is routed through the various stages, the gas is exposed to a solvent with sequentially lower sour gas loading.

Figure 10B:
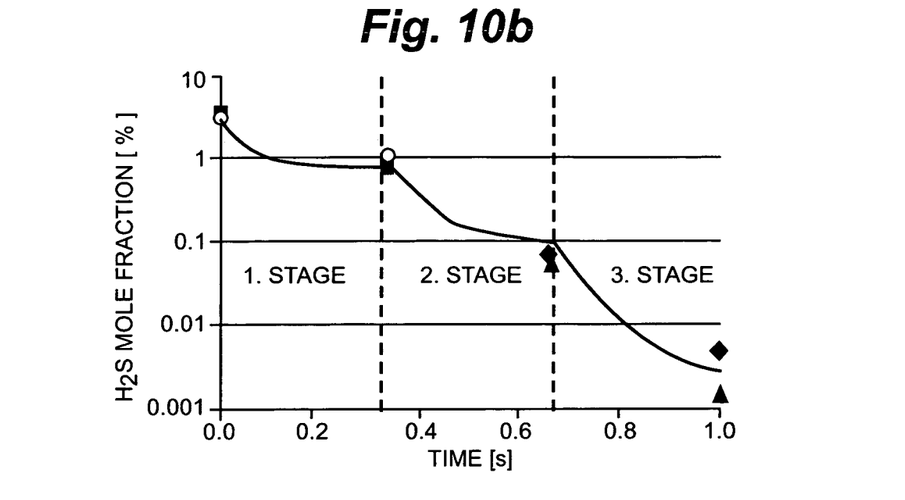

FIG. 10a shows a configuration of contactors in series which may be used in particular for selective removal of $H_2S$ in preference to $CO_2$. The individual contactors 50, 60, 70 each have their own separators 51, 61, 71 associated with them The sour gas stream 81 is fed into the left hand contactor 70 together with a solvent stream 93 which has already passed through the two contactors 50, 60. The mixture which leaves the contactor 70 is separated in separator 71 and the $H_2S$ rich solvent 94 is preferably sent for regeneration. The leaner gas stream 82 is passed directly to the second contactor 60 where it is treated with a solvent stream 92 which has already passed through contactor 50. Again the mixture is separated in a separator 61 and the gas stream 83 is fed to the third contactor 50 and the liquid stream, richer in $H_2S$ is fed to the contactor 70. The gas stream 83 which still contains some $H_2S$ is treated with lean solvent from stream 91 in contactor 50. The level of $H_2S$ in the gas stream is then reduced to an acceptable level (for example 15 ppm) and the treated gas is removed from separator 51 in stream 84. The slightly $H_2S$ rich solvent is passed in stream 92 to the second contactor 60. In this way, the system operates as a counter-current system whereby the leanest gas is treated with the leanest solvent but each individual stage is still a co-current operation. This avoids some of the problems traditionally associated with counter-current operations such as foaming, low reaction rates and size. FIG. 10b shows examples of typical inlet and outlet $H_2S$ concentrations for each of the three contactors. As expected, the greatest absorption of $H_2S$ occurs in the third contactor 50 when it is treated with the leanest solvent.

Although a three-stage process has been shown in FIG. 10a, it will of course be appreciated that the same principle applies for just two stages or for more than three stages. The use of the contactors of the present invention, which, because of the extremely efficient mixing only require a very short residence time, means that $H_2S$ can be selectively absorbed in preference to $CO_2$. The $H_2S$ is therefore selectively absorbed over the three columns while the co-absorption of $CO_2$ is kept low. The co-absorption of the $CO_2$ may be of the order of just 3% of the $CO_2$ present at each stage giving just 9–10% co-absorption of $CO_2$ over the whole system. This compares with a value of 60% of the $CO_2$ present in conventional systems. The solvent leaving the system is therefore substantially loaded with $H_2S$ rather than $CO_2$ and the feed to the Claus plant is less inhibited with inert gas.

The contactors of the present invention may also be used for high-pressure sour gas removal. One particular advantage of the apparatus of the present invention is that it is substantially more compact than conventional systems and may therefore be particularly applicable for use in offshore applications. Current pipeline specifications for levels of $CO_2$ and $H_2S$ are of the order of 2–4% $CO_2$ and 2–4 ppm $H_2S$. A single stage contactor according to the present invention may be used to simultaneously reduce the $CO_2$ and $H_2S$ content down to acceptable levels by the adoption of a suitable solvent. Of course, a multi-stage system could be employed to further reduce the levels of these sour gas components. For example, if the inlet concentration of the $H_2S$ is particularly high, for example 100 ppm —5% by volume, then it may be necessary to have further stages for reduction of $H_2S$ down to the 2–4 ppm level required.

Figure 11:
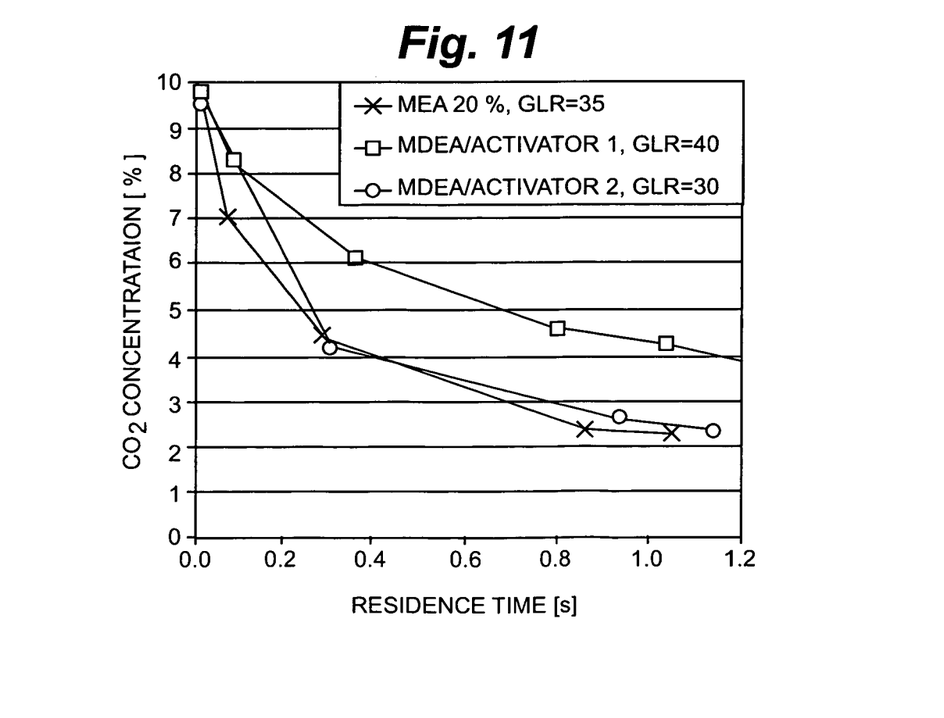
FIG. 11 shows a graph of $CO_2$ concentration against residence time for a variety of solvent solutions.

FIG. 11 shows curves of $CO_2$ concentration against residence time for three different solvents. It can be seen that using MDEA with activator 2 at a gas-liquid ratio of 30 produces similar $CO_2$ absorption as a 20% solution of MEA at a gas-liquid ratio of 35. With the lower gas-liquid ratios it has been possible to obtain solvent loadings of 0.63 mole $CO_2$ per mole of amine using the contactor of the present invention. The experimental results therefore show that both selective $H_2S$ removal and bulk $CO_2$ removal can be achieved using the apparatus of the present invention. Any sour gas feed concentration generally within the ranges discussed above can therefore be treated using the apparatus of the present invention by the selection of a suitable solvent and contacting system.

The present invention may also be used for de-oxygenation of water. Seawater for reservoir injection must be stripped for dissolved oxygen in order to reduce undesirable oxygenation and bacteria/algae activity in the reservoir. Seawater at the surface typically contains approximately 12 ppm dissolved oxygen whereas requirements for the oxygen content in injected water are 20–40 ppb. Conventional equipment for de-oxygenation of seawater includes stripping with natural gas in a counter-current column at atmospheric pressure or vacuum. Residual oxygen is removed with oxygen scavenger chemicals. This is an expensive process, as the equipment is large and heavy. The seawater is also pre-treated with several other chemicals prior to reservoir injection.

Chemical de-aeration is another well-established process, and has found many applications in the chemical industry and in high temperature water systems (e.g. steam systems). Chemical oxygen removal is also applied in reservoir water injection applications. However, due to large flow-rates, chemicals are only used to remove residual oxygen after stripping. This is denoted $O_2$ scavenging.

The apparatus and process of the present invention can be used to provide a more efficient method for the de-oxygenation of water. Using natural gas in a series of contactors is an extremely space efficient way of reducing the oxygen level to the required limit.

Similarly, the apparatus and method may be used for dehydration of natural gas. Traditionally water is absorbed using a glycol-type solvent. The contactors of the present invention may be used in series to remove the water from the natural gas before the gas is passed to the customer. In processes where acid gas removal is also required, the dehydration plant may be installed downstream for the acid gas removal plant.

The above uses are merely examples of the flexibility of the apparatus and method of the present invention and are not intended to be limiting.

The invention claimed is:

1. A method of distributing a liquid into a gas stream which comprises providing a first contactor having a pipe in which a gas stream is flowing and providing a liquid to the pipe in which the gas stream is flowing, the gas flow drawing the liquid into a film along the inner surface of the pipe to a sharp edge at the end of the pipe at which point the liquid breaks off the surface of the pipe and mixes intimately with the gas, wherein the liquid is introduced through a passage to the inner surface of the pipe in the form of an annulus around a circumference of the inner surface of the pipe, and wherein a pressure across the passage is controlled to enable distribution of the liquid in the film around said circumference.

2. A method as claimed in claim 1, in which the method is carried out as a continuous process with the gas and liquid flowing co-currently.

3. A method as claimed in claim 1, in which the pipe section upstream from the reaction zone in which the gas stream is flowing is a converging pipe section which accelerates the gas as it passes the annulus of liquid.

4. A method as claimed in claim 1, in which the method further includes the step of separating a gas phase and a liquid phase after the turbulent mixing.

5. A method as claimed in claim 4, in which the mixture is cooled prior to separation into a gas phase and a liquid phase.

6. A method as claimed in claim 4, in which the liquid phase is subsequently treated to remove any absorbed gas component.

7. A method as claimed in claim 6, in which the treatment is carried out by heating and/or by flashing of the absorbed gas component in a flash tank.

8. A method as claimed in claim 7, in which the post mixing cooling and the regenerative heating are achieved, at least in part, by mutual heat exchange.

9. A method as claimed in claim 6, in which the treated liquid is recycled to the liquid feed to the pipe.

10. A method as claimed in claim 4, in which the liquid phase is recycled (without treatment) to the liquid feed to the pipe.

11. A method as claimed in claim 1, in which the gas stream is a mixture from which one or more selected components are removed using one or more solvents or reagents.

12. A method as claimed in claim 11, in which the gas mixture includes one or more acid gas components.

13. A method as claimed in claim 1, in which the gas stream is a single gas which is absorbed.

14. A method as claimed in claim 1, in which there is a diverging section of pipe after the reaction zone to expand the gas.

15. A method as claimed in claim 1, in which a second contactor is placed in series with the first contactor.

16. A method as claimed in claim 15, in which there is a further supply of liquid to the second contactor.

17. Apparatus for distributing a liquid into a gas stream comprising a turbulent contactor having a contracting pipe section through which a gas stream flows, a passage, a sharp edge at the end of the contracting pipe section and a further pipe section downstream of the sharp edge, wherein the passage is arranged to introduce an annulus of liquid through the passage around the internal perimeter of the contracting pipe section, wherein a pressure at the passage is controlled to enable distribution of the annulus of liquid in a film around the internal perimeter, wherein the prior art reference 769,821 to Aktiebolaget Svenska Flaktfabiken disclose liquid introduction though inlet 3 in spray pattern but not through a passage which is controlled to enable of distribution of liquid in the film around an inner circumference of a pipe.

18. Apparatus as claimed in claim 17, in which there is a diverging section downstream of the sharp edge.

19. Apparatus as claimed in claim 17, in which the sharp edge is substantially a right angle.

20. Apparatus as claimed in claim 17, in which the gas stream and the liquid are formed into a homogenous mixture in the contactor.

21. A method for absorbing a selected gas component from a gas stream by bringing the gas stream into contact with liquid including a solvent or a reagent for the selected gas component using a turbulent contactor having a contracting pipe section through which a gas stream flows, a passage arranged to introduce an annulus of liquid through the passage around the internal perimeter of the pipe, wherein a pressure at the passage is controlled to enable distribution of the liquid in a film around the internal perimeter, and a sharp edge at the end of the contracting pipe and a further pipe section downstream of the sharp edge.

22. The method of claim 21, wherein $H_2S$ is scavenged from natural gas.

23. The method of claim 21, wherein $H_2S$ is selectively removed from a natural gas in preference to $CO_2$.

24. The method of claim 21 wherein a plurality of acid gas components are simultaneously removed from a natural gas stream.

25. The method of claim 21 wherein existing columns are used in combination with said turbulent contactor to adapt an existing plant to accommodate a change in the feed conditions.

26. The method of claim 21 wherein water is de-oxygenised.

27. The method of claim 21 wherein natural gas is dehydrated.

* * * * *